United States Patent
Hui

(10) Patent No.: US 6,982,762 B1
(45) Date of Patent: Jan. 3, 2006

(54) SEQUENCE ADAPTIVE BIT ALLOCATION FOR PICTURES ENCODING

(75) Inventor: Yau Wai Lucas Hui, Singapore (SG)

(73) Assignee: STMicroelectronics Asia Pacific Pte Limited, Singapore (SG)

( * ) Notice: Subject to any disclaimer, the term of this patent is extended or adjusted under 35 U.S.C. 154(b) by 0 days.

(21) Appl. No.: 09/701,089

(22) PCT Filed: May 30, 1998

(86) PCT No.: PCT/SG98/00038

§ 371 (c)(1),
(2), (4) Date: Jan. 26, 2001

(87) PCT Pub. No.: WO99/63760

PCT Pub. Date: Dec. 9, 1999

(51) Int. Cl.
*H04N 7/18* (2006.01)

(52) U.S. Cl. ............. 348/405; 375/240.05; 375/240.06; 375/240.03

(58) Field of Classification Search ............................... 375/240.01–240.17
See application file for complete search history.

(56) References Cited

U.S. PATENT DOCUMENTS

| | | | | | |
|---|---|---|---|---|---|
| 5,995,151 | A | * | 11/1999 | Naveen et al. | 375/240.24 |
| 6,229,849 | B1 | * | 5/2001 | Mihara | 375/240.05 |
| 6,535,251 | B1 | * | 3/2003 | Ribas-Corbera | 348/405.1 |
| 6,570,922 | B1 | * | 5/2003 | Wang et al. | 375/240.12 |

FOREIGN PATENT DOCUMENTS

| | | |
|---|---|---|
| EP | 0 655 867 A1 | 5/1995 |
| EP | 0 804 035 A2 | 10/1997 |

* cited by examiner

*Primary Examiner*—Andy Rao
(74) *Attorney, Agent, or Firm*—Lisa K. Jorgenson; Robert Iannucci; Seed IP Law Group PLLC

(57) ABSTRACT

A method and apparatus for encoding pictures of a moving pictures sequence according to an overall target bit-rate, such as in a MPEG video encoder. Each picture has an assigned picture coding type for which a quality factor is adaptively determined according to past bit usages, so that bits can be adaptively allocated amongst picture types for optimizing visual quality of the encoded pictures.

21 Claims, 2 Drawing Sheets

SEQUENCE ADAPTIVE BIT ALLOCATION FOR PICTURES ENCODING

TECHNICAL FIELD

The present invention relates to a method and apparatus for encoding moving pictures sequences. In particular, the present invention relates to a method and apparatus for bit location in a video signal compression system.

BACKGROUND ART

Methods for encoding moving pictures or video had been developed for efficient transmission and storage. A current art of such encoding methods is found in MPEG2 Test Model 5, ISO/IEC JTC1/SC29/WG11/NO400, April 1993, and the disclosure of that document is hereby expressly incorporated herein by reference. In this method, an input video sequence is organized into sequence layer, group-of-pictures, pictures, slices, macroblocks, and finally block layer. Each picture in a group-of-pictures will be coded according to its determined picture coding type.

The picture coding types used in the MPEG2 Test Model 5 include intra-coded picture (I-picture), predictive-coded picture (P-picture), and bi-directionally predictive-coded picture (B-picture). The I-pictures are used mainly for random access or scene update. The P-pictures use forward motion predictive coding with reference to previously coded I- or P-pictures (anchor pictures), and the B-pictures use both forward and backward motion predictive/interpolative coding with reference to previously coded I- or P-pictures. A group of pictures (GOP) is formed in encoded order starting with an I-picture and ending with the picture before the next I-picture in the sequence.

A picture is partitioned into smaller and non-overlapping blocks of pixel data called macroblocks (MB) before encoding. Each MB from a P- or B-picture is subjected to a motion estimation process in which forward motion vectors, and backward motion vectors for the case of a B-picture MB, are determined using reference pictures from a frame buffer. With the determined motion vectors, motion compensation is performed where the intra- or inter-picture prediction mode of the MB is first determined according to the accuracy of the motion vectors found, followed by generating the necessary predicted MB containing the prediction error.

The predicted MB is then subjected to discrete cosine transform (DCT) and quantization of the DCT coefficients based on quantization matrices and quantization step-size. The quantized DCT coefficients of the MB is then run-length encoded with variable length codes (VLC) and multiplexed with additional information such as selected motion vectors, MB coding modes, quantization step-size, and/or picture and sequence information, to form the output bitstream.

Local decoding is performed by inverse quantizing the quantized DCT coefficients, followed by inverse DCT, and motion compensation. Local decoding is performed such that the reference pictures used in the motion compensation are identical to those used by any external decoder.

The quantization step-size (QS) used for quantizing the DCT coefficients of each MB has a direct impact on the number of bits produced at the output of the run-length VLC encoding process, and therefore the average output bit rate. It has also a direct impact on the encoding quality, which represents the output picture quality at the corresponding decoder. In general, larger QS generates lower output bit rate and lower encoding quality. In order to control output bit rate and picture quality so that the resulting bitstream can satisfy channel bandwidth or storage limitation as well as quality requirements, rate control and quantization control algorithms are used.

Some methods for rate control and quantization control can be found in the above mentioned MPEG-2 Test Model 5. These methods comprise generally a bit allocation process, a rate control process, and an adaptive quantization process. In the bit allocation process, a target number of bits is assigned for a new picture to be coded according to a number of previously determined and pre-set parameters. The rate control step then calculates a reference quantization step-size for each MB based on the target bits for the picture and the number of bits already used from the target bits in encoding MBs from that picture. In the adaptive quantization process, the calculated reference quantization step-size is scaled according to local activities of the MB, and an average MB activity determined from the current or a previously coded picture. This scaling is done according to a level of masking effects of coding noise by human perception for MB with high or low activities within a picture. A video buffer verifier (VBV) may also be employed in such a way that underflow and overflow of the decoder input buffer are prevented as required by the MPEG standard to ensure a target bit rate is maintained.

It is assumed in the bit allocation process that the visual quality of a coded picture can be qualified with a single number $V_Q$, expressed by the formula:

$$V_Q = \frac{K}{Q} \qquad (1)$$

where Q is the average quantization step-size of the coded picture and K is a constant quality factor which depends only on the picture coding type. It is also assumed that the visual qualities of all encoded pictures should be maintained at a similar level within a GOP. Therefore, for all pictures within a GOP, the bit allocation process maintains the following equality:

$$\frac{K_I}{Q_I} \approx \frac{K_P}{Q_P} \approx \frac{K_B}{Q_B} \qquad (2)$$

where $Q_I$, $Q_P$, $Q_B$ are the respective average quantization step-sizes of coded I-, P-, and B-picture, and similarly $K_I$, $K_P$, $K_B$ are respective pre-determined quality factors for I-, P-, and B-pictures. Although this equality does not apply to an entire pictures sequence, it should be considered valid within a GOP as well as across consecutive GOP boundaries. For simplicity, $K_I$, of equation (2) is normalized to the value of 1.

From the above assumptions, an equation for determining target bit allocation for a picture to be coded can be derived for each of the picture coding types. The equations are given as follows for each of the I-, P- and B-picture coding type:

$$T_I = \frac{R}{1 + N_P\left(\frac{X_P K_I}{X_I K_P}\right) + N_B\left(\frac{X_B K_I}{X_I K_B}\right)} \qquad (3)$$

$$T_P = \frac{R}{N_P + N_B\left(\frac{X_B K_P}{X_P K_B}\right)} \qquad (4)$$

-continued $$T_B = \frac{R}{N_B + N_P\left(\frac{X_P K_B}{X_B X_P}\right)} \quad (5)$$

where $$X_I = S_I Q_I, X_P = S_P Q_P, X_B = S_B Q_B,$$

and $S_I$, $S_P$, $S_B$ are number of bits used by previously encoded I-, P-, B-picture respectively, $Q_I$, $Q_P$, $Q_B$ are the average quantization step-size used by previously encoded I-, P-, B-picture respectively, $N_P$ and $N_B$ are the number of P- and B-pictures remaining in the current GOP with respect to the current picture to be coded, R is the remaining number of bits assigned to the GOP according to a target bit-rate, and $T_I$, $T_P$, $T_B$ are the calculated target bit allocation for a new I-, P-, B-picture to be coded respectively.

An optional lower limit may be applied to the determined target bit allocation as given in the MPEG2 Test Model 5, hence:

$$(T_I \text{ or } T_P \text{ or } T_B) \geq \frac{\text{Bit\_Rate}}{K_1 \times \text{Picture\_Rate}} \quad (6)$$

where Bit_Rate is the target bitrate,

Picture_Rate is number of pictures coded per second, and $K_1$ is a constant (eg. 8).

A typical video encoder system is designed to code picture sequences with various characteristics and complexities. In particular, sequences with little motion updates or complex motion scenes creates different requirements for coding pictures of difference picture coding types.

For example, a sequence with little motion updates may be best coded with higher ratio of bits allocated to the anchor pictures (I-pictures and P-pictures) for visual quality improvements. On the other hand, a sequence with complex motion scenes may be best coded with relatively even distribution of bits to pictures of all picture coding types for motion detail improvements, and hence higher ratio of bit allocation to the B-pictures. Present systems based on fixed visual quality ratios, for example according to equation (2), do not adequately address these changes in sequence characteristics.

In other words, the pre-determined and fixed quality factors $K_I$, $K_P$, and $K_B$ have more or less determined the ratios of the average quantization step-sizes (ie. $Q_I$, $Q_P$, and $Q_B$ ratios) to be used for coding pictures of different picture coding types. This relationship limits the adaptivity of bit allocation to different picture coding types of different motion characteristics.

Furthermore, the adaptivity of bit allocation should depend on the visual quality itself. When higher visual quality is achieved for the anchor pictures, a feature which re-distributes the bits to B-pictures is desired such that both visual quality and motion details can be balanced.

SUMMARY OF THE INVENTION

It is an object of the present invention to provide a method or apparatus for picture sequence compression which better caters for changes in sequence and coding characteristics. In particular, an object of the present invention is to provide a method or apparatus for improving bit allocation.

While sophisticated methods of determining motion characteristics by frame difference detection or motion vector analysis may be employed, such methods may have significant impact on implementation cost. Implementation cost may be an important consideration for systems to be broadly used. A further object of the present invention is therefore to provide a method or apparatus for bit allocation with low implementation complexity.

One way of solving the above mentioned problems is to adaptively determine new quality factors $K_I$, $K_P$, and $K_B$ of equations (2), (3), (4), and (5) according to characteristics or parameters obtained from past coded pictures from a sequence. This is in effect changing the target ratios of the average quantization step-sizes for I-, P-, and B-pictures such that visual quality and/or motion details can be improved depending on the contents within the sequence.

A further simplified approach is to adaptively modify only the value of $K_B$, therefore the target ratios of the average quantization step-size of B-pictures over that of I- or P-pictures', as experimentally determined that the impact is not significant in terms of solving above mentioned problems when $K_I$ or $K_P$ are also modified adaptively.

The quality factors are modified adaptively in the present invention according to the average quantization step-sizes and bit usage of past coded I-pictures, P-pictures and B-pictures. Encoding quality and coding complexity of a picture may be measured from its average quantization step-size and bits used. The ratios of coding complexities of pictures of different picture coding types together with encoding qualities may be used to indicate spatial and/or motion complexity, and therefore, the quality factors may be determined accordingly.

A video encoding system encodes a video sequence of various picture coding types (I-, P- and B-pictures) with sequence adaptive bit allocation according to the present invention. Initial values of necessary parameters for coding may be pre-determined. Bits are allocated to each picture to be coded such that the resulting visual qualities defined as K/Q of all pictures within a group-of-pictures remains at a similar level.

The quality factor K is dependent on the picture coding type; and furthermore, K, is adaptively modified according to the average quantization step-sizes (Q) and bit usages of past coded pictures.

With bits allocated to a picture to be coded, a rate controller is then used to regulate bits for coding of each macroblock within the picture. A video encoding system according to the present invention may include components that are similar to those used in the MPEG2 Test Model 5.

BRIEF DESCRIPTION OF THE DRAWINGS

The invention is described in greater detail hereinafter, by way of example only, with reference to a preferred embodiment thereof and the accompanying drawings, wherein.

DETAILED DESCRIPTION OF THE PREFERRED EMBODIMENT

Figure 1:
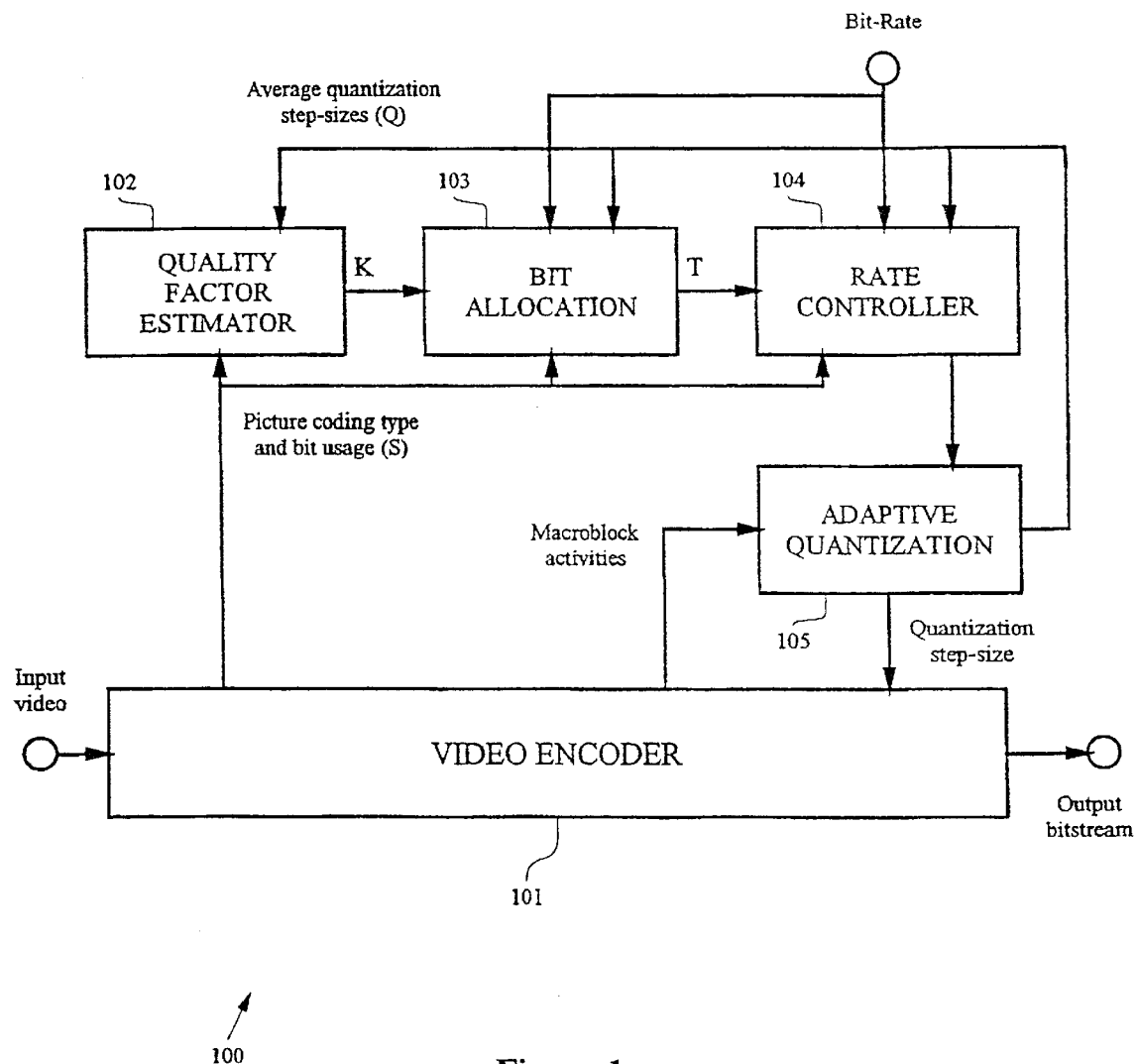
FIG. 1 is a block diagram illustrating a video encoding system with sequence adaptive bit allocation according to an embodiment of the present invention.

FIG. 1 illustrates a video encoding system 100 with sequence adaptive bit allocation according to an embodiment of the present invention. An input video picture sequence is encoded by a video encoder 101 to produce a compressed output bitstream which may be transmitted to an external decoder via a communication channel or recorded on digital storage media for playback applications. Each picture from the input video sequence is coded according to its assigned picture coding type (I-, P-, or B-picture). A group-of-pictures (GOP) is formed starting with an I-picture, and followed by possibly sets of P-pictures and B-pictures.

Typically, the video encoder 101 utilizes motion estimation, motion compensation, discrete cosine transform (DCT) coding, and run-length/differential encoding with variable length codes (VLC) as video compression techniques. A video encoder may be implemented such that the output bitstream is compliant to one of the ISO/IEC MPEG standards, and can be decoded by the corresponding MPEG video decoders.

A bit allocation processor 103 is coupled to or forms part of the video encoder, and is provided to determine a target number of bits (T) to be used for coding of a picture from the input video according to its picture coding type and target bit-rate. The target bit-rate and picture coding type are provided as input to the bit allocation processor 103. Bits are allocated so that the resulting visual qualities defined as K/Q of all pictures within a group-of-pictures remains at a similar level. The quality factor K depends on the picture coding type (eg. $K_I$, $K_P$, $K_B$) and Q is the average quantization step-size used for coding that picture type. Example methods of bit allocation may be found in MPEG2 Test Model 5, as given by equations (3), (4), (5) with an optional lower limit given by (6). A set of initial values may be assumed for $K_I$, $K_P$, $K_B$, $X_I$, $X_P$, and $X_B$.

After determining the target bits (T), a bit rate controller 104 and an adaptive quantization processor 105 are used to calculate the quantization step-sizes for coding of each macroblock (MB) in the picture. The quantization step-sizes are used optionally together with quantization matrices to quantize the MBs within the video encoder 101. The MBs may be subjected to motion estimation, motion compensation, and discrete cosine transform prior to quantization. Frame field adaptive methods mentioned in MPEG2 Test Model 5 may also be applied. The quantized MBs are run-length encoded with variable length codes and multiplexed with all necessary side information to provide the compressed output bitstream.

The rate controller 104 calculates a reference quantization step-size for each MB based on the target bits (T) for the pictures and the number of bits consumed from the target bits in encoding MBs from that picture. For adaptive quantization 105, the calculated reference step-size is scaled according to local activities of the MB and an average MB activity determined from the current or a previously coded picture. Methods of rate control and adaptive quantization may also be found in MPEG2 Test Model 5.

A quality factor estimator 102 is used to estimate the values of K according to the picture coding type and bit usages (S) of past coded pictures supplied as input from the video encoder, and the average quantization step-sizes (Q) which are supplied from the adaptive quantization processor 105. Together with the average quantization step-size Q, the quality factor K determines the visual quality of an encoded picture. A set of values for K may be determined for each picture coding type. Hence, $K_I$, $K_P$, and $K_B$ may be adaptively determined. Furthermore, the set of values for K may be updated at for each picture or for every plurality of pictures, according to computation and visual quality adaptivity needs. The estimated values of K are used by bit allocation processor 103 to determine the target number of bits to be used for coding of each picture.

Figure 2:
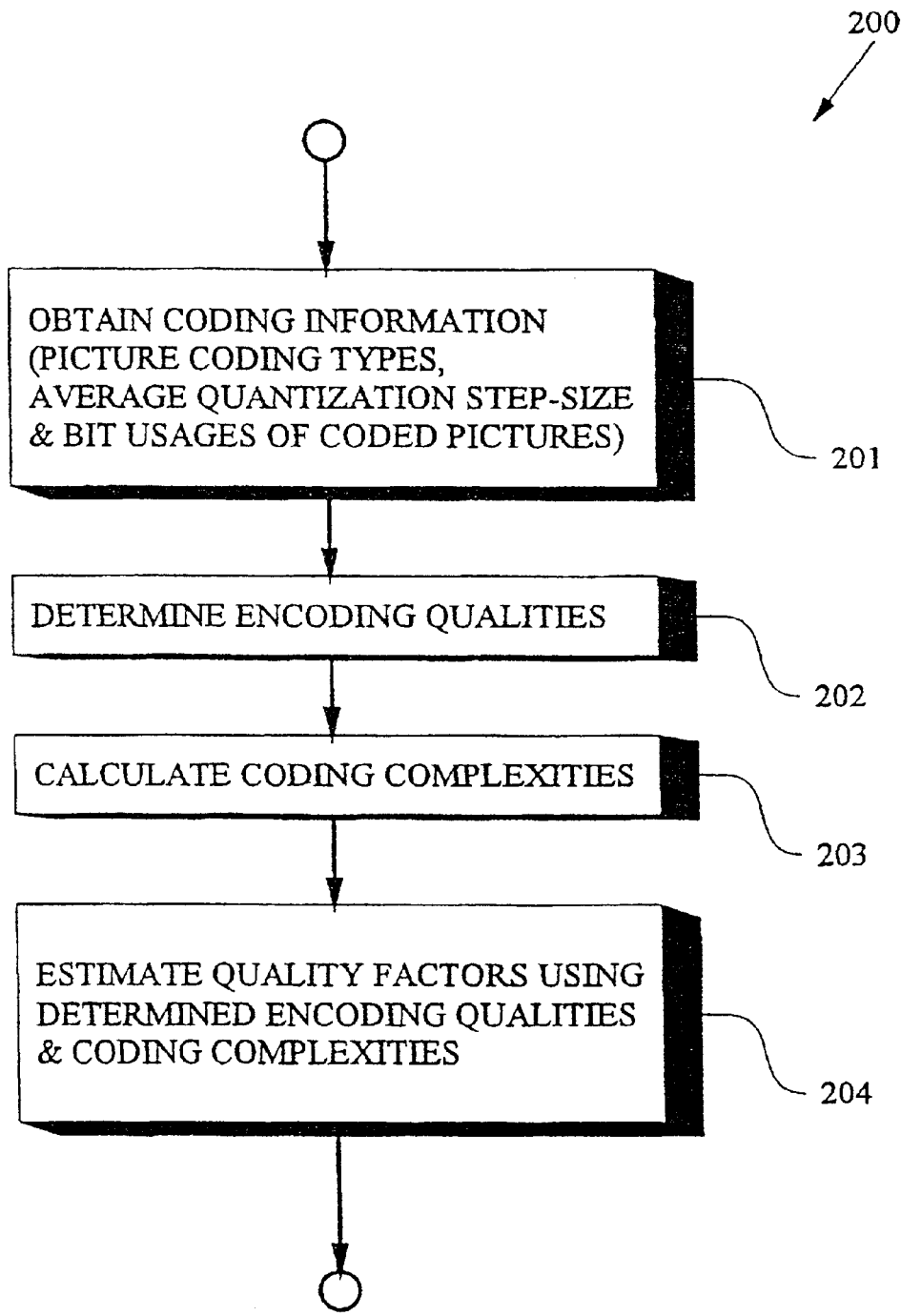
FIG. 2 is a flow chart of an embodiment of a Quality Factor Estimator of present invention.

FIG. 2 illustrates a flow chart 200 of operational steps of the quality factor estimator according to an embodiment of the present invention. Starting with step 201, coding information such as the picture coding types, the average quantization step-sizes and bit usages of coded pictures are obtained. For step 202, encoding qualities are determined using the average quantization step-sizes. The encoding qualities for past coded pictures of different picture coding types are determined for the purpose of re-distributing bits to B-pictures when good encoding quality for P-pictures is achieved. Similarly, bits are re-distributed to I-pictures when good encoding qualities for P-pictures and B-pictures are achieved. For example, it is possible to set a maximum and minimum limit for the value of K of a particular picture coding type using average quantization step-sizes for past coded pictures as one such method. In particular, a simplified embodiment may be given as follows:

$$K_{B-MIN} = C_O$$

$$K_{B-MAX} = C_1 \times Q_P + C_2, \text{ and}$$

$$C_3 \leq K_{B-MAX} \leq C_4$$

where $C_O$ to $C_4$ are constants (eg. 1.4, 0.3, −0.4, 1.4, 2.0 respectively), $Q_P$ is the average reference quantization step-size of a past coded P-picture, and $K_{B-MAX}$ and $K_{B-MIN}$ are the maximum and minimum quality factor K for B-pictures.

Similarly, $K_{I-MAX}$, $K_{I-MIN}$, $K_{P-MAX}$, and $K_{P-MIN}$ for I-pictures and P-pictures may be determined. In fact, for simplicity $K_{I-MAX}$, $K_{I-MIN}$, $K_{P-MAX}$, and $K_{P-MIN}$ may also be normalized to the constant value of 1.0.

At 203, the coding complexities ($X_I$, $X_P$, $X_B$) of past coded pictures are calculated. The coding complexity indicates spatial and/or motion complexity in coding picture of a particular picture coding type. It is given as:

$$X_I = S_I \times Q_I$$

$$X_P = S_P \times Q_P$$

$$X_B = S_B \times Q_B$$

where $S_I$, $S_P$, $S_B$ are the number of bits generated by encoding a past I-picture, P-picture and B-picture respectively, and $Q_I$, $Q_P$, $Q_B$ are the average quantization step-size used for encoding all macroblocks of the I-picture, P-picture and B-picture respectively.

With the determined encoding qualities and coding complexities, the quality factors ($K_I$, $K_P$, and $K_B$) are estimated at the next step 204. The ratios of coding complexity of different picture coding type are used to define the ratios of the quality factors such that the bit allocation process can take into consideration spatial and/or motion complexities of different picture coding types. Furthermore, the ratios of the quality factors are also limited according to the determined encoding qualities so as to maximize visual quality and motion details. For simplicity, the quality factors can be normalized according to the following example:

$$K_I = C_5 \times \frac{X_P}{X_I} + C_6, \text{ and set } K_{I\text{-MIN}} \leq K_I \leq K_{I\text{-MAX}} \quad (7)$$

$$K_P = 1.0, \quad (8)$$

$$K_B = C_7 \times \frac{X_P}{X_B} + C_8, \text{ and set } K_{B\text{-MIN}} \leq K_B \leq K_{B\text{-MAX}} \quad (9)$$

where $C_5$ to $C_8$ are constants.

The values of $C_5$ to $C_8$ may be experimentally determined. It is also possible to fisher simplify the method by setting $C_5$ to $C_8$ to values of 0, 1, 1, 0 respectively.

The bit allocation process attempts to maintain similar visual quality which is based on the average quantization step-sizes and the quality factors ($K_I$, $K_P$, and $K_B$) while encoding pictures or groups of pictures from an input video sequence. By adaptively modifying the quality factors according to picture coding types, and encoding qualities and coding complexities determined by the average quantization step-sizes and bit usages of coded pictures, a video encoder according to an embodiment of the present invention can efficiently allocate bits from a target bit-rate to encode each pictures within the video sequence.

The quality factors are adapted in such a way that more bits are used for motion detail improvements when there are complex motion scenes within the picture sequence; and on the other hand, more bits are allocated to improve visual (spatial) quality when scenes within picture sequence contain little motion updates. The bit allocation is further checked with the encoding qualities achieved so that the both motion details and visual quality can be optimized to enhance the overall objective results of the video encoder.

What is claimed is:

1. A moving pictures encoder for encoding pictures in a moving pictures sequence according to an overall target bit-rate, each picture having an assigned picture coding type, the moving pictures encoder including:
   a quality factor estimator including means for determining a picture complexity for each assigned picture coding type based on a number of bits used for past coded pictures of that type, and an average quantization step-size for past coded pictures of that type;
   a bit allocation processor for determining a target number of bits for coding a picture according to the overall target bit-rate, the assigned picture coding type and a quality factor for the assigned picture coding type, the quality factor being defined as the product of a visual quality and the average quantization step-size for past coded pictures of that type;
   a bit-rate controller for determining a reference quantization step-size based on the target number of bits and the number of bits used for the picture; and
   an adaptive quantization processor for determining a coding quantization step-size based on the reference quantization step-size and picture activities for the picture, and for determining said average quantization step-size for past coded pictures, wherein the quality factor estimator includes means for determining the quality factor of the assigned picture coding type as a function of a ratio of the picture complexity of the assigned picture coding type to the picture complexity of at least one other picture coding type.

2. A moving pictures encoder as claimed in claim 1 wherein a corresponding quality factor is determined by the quality factor estimator for each picture type.

3. A moving pictures encoder as claimed in claim 2 wherein a value for the quality factor is determined for coding of each picture of the corresponding picture type.

4. A moving pictures encoder as claimed in claim 2 wherein a value for the quality factor is determined for coding of each plurality of pictures of the corresponding picture type.

5. A moving pictures encoder as claimed in claim 2, wherein minimum and maximum limits are set for the quality factor of each picture type.

6. A method for encoding pictures in a moving pictures sequence according to an overall target bit-rate, each picture having an assigned picture coding type, including the steps of:
   determining a picture complexity for the assigned picture coding type based on a number of bits used for past coded pictures of that type, and an average quantization step-size for past coded pictures;
   determining a target number of bits for coding a picture according to the overall target bit-rate, the assigned picture coding type, and a quality factor for the assigned picture coding type;
   determining a reference quantization step-size based on the target number of bits and the number of bits used for the picture;
   determining a coding quantization step-size based on the reference quantization step-size and picture activities for the picture, and the average quantization step-size for past coded pictures; and
   determining the quality factor of the assigned picture coding type as a function of the picture complexities of the assigned picture coding type and of at least one other picture coding type.

7. A method as claimed in claim 6, wherein a corresponding quality factor is determined for each picture type.

8. A method as claimed in claim 7, wherein a value for the quality factor is determined for coding of each picture of the corresponding picture type.

9. A method as claimed in claim 7, wherein a value for the quality factor is determined for coding of each plurality of pictures of the corresponding picture type.

10. A method as claimed in claim 7, wherein minimum and maximum limits are set for the quality factor of each picture type.

11. An encoder for encoding pictures in a moving pictures sequence according to an overall target bit-rate, each picture having an assigned picture coding type, the encoder comprising:
    a quality factor estimator including means for determining a picture complexity for each picture coding type based on a number of bits used for past coded pictures of that type, and an average quantization step-size for past coded pictures of that type;
    a bit allocation processor for determining a target number of bits for coding the selected picture according to the overall target bit-rate, the picture coding type and a quality factor for the assigned picture coding type, the quality factor being defined as the product of a visual quality and the average quantization step-size for past coded pictures of that type;
    a bit-rate controller for determining a reference quantization step-size based on the target number of bits and the number of bits used for the picture; and an adaptive quantization processor for determining a coding quantization step-size based on the reference quantization step-size and picture activities for the picture, and for determining said average quantization step-size for past coded pictures, wherein the quality factor estimator includes means for determining the quality factor of the assigned picture coding type as a function of a ratio of the picture complexity of the assigned picture coding type to the picture complexity of at least one other picture coding type.

12. The encoder of claim 11 wherein the quality factor estimator determines a quality factor for the selected picture based on the number of bits used for past coded pictures of the picture coding type of the selected picture.

13. The encoder of claim 11 wherein the quality factor estimator determines a quality factor for the selected picture based on the number of bits used for past coded pictures of a different picture coding type than the assigned picture coding type of the selected picture.

14. The encoder of claim 11 wherein the quality factor estimator further determines the quality factor for the selected picture based on quality factors for past coded pictures of a different picture coding type than the picture coding type of the selected picture.

15. The encoder of claim 11 wherein the quality factor estimator determines the quality factor for the selected picture within predetermined minimum and maximum limits.

16. A method for encoding pictures in a moving pictures sequence, each picture having an assigned picture coding type assigned from a predetermined selection of picture coding types, the method comprising:

dynamically calculating a quality factor for a selected picture having a first assigned picture coding type as a function of a ration of a complexity calculation for the first assigned picture coding type to a complexity calculation for a second assigned picture coding type other than the first assigned picture coding type so that the quality factor for the selected picture matches the quality factors for the past coded pictures within a predetermined range, the complexity calculation for each of the first and second assigned picture coding types being based on a number of bits generated by encoding a past picture of the same assigned picture coding type;

determining a target number of bits for coding the selected picture according to the overall target bit-rate, the first assigned picture coding type, and the calculated quality factor;

determining a coding quantization step-size based on the target number of bits; and encoding the selected picture according to the determined coding quantization step-size.

17. The method of claim 16 wherein the quality factor for the selected picture is further based on a number of bits used for past coded pictures, and an average quantization step-size for past coded pictures.

18. The method of claim 16 wherein the quantization step-size is determined based on the reference quantization step-size and picture activities for the selected picture, and an average quantization step-size for past coded pictures.

19. The method of claim 16 wherein the predetermined range is used to calculate a minimum and maximum quality factor values for the selected picture.

20. The method of claim 16 wherein the quality factor for the selected picture is calculated based on the number of bits used for past coded pictures of the first picture coding type.

21. The method of claim 16 wherein the quality factor for the selected picture is calculated based on the number of bits used for past coded pictures having a picture coding type different from first picture coding type.

* * * * *